(12) United States Patent
Takagi et al.

(10) Patent No.: US 10,983,426 B2
(45) Date of Patent: Apr. 20, 2021

(54) PROJECTOR

(71) Applicant: SEIKO EPSON CORPORATION, Tokyo (JP)

(72) Inventors: Kunihiko Takagi, Okaya (JP); Katsuyuki Uehara, Azumino (JP); Takeshi Takezawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/788,352

(22) Filed: Feb. 12, 2020

(65) Prior Publication Data

US 2020/0257188 A1 Aug. 13, 2020

(30) Foreign Application Priority Data

Feb. 13, 2019 (JP) .............................. JP2019-023279

(51) Int. Cl.
*G03B 21/20* (2006.01)
*G02B 27/14* (2006.01)
*G02B 27/10* (2006.01)

(52) U.S. Cl.
CPC ....... *G03B 21/204* (2013.01); *G02B 27/1006* (2013.01); *G02B 27/141* (2013.01); *G03B 21/2066* (2013.01); *G03B 21/2073* (2013.01)

(58) Field of Classification Search
CPC .............. G03B 21/204; G03B 21/2066; G03B 21/2073; G02B 27/1006; G02B 27/141; G02B 27/149
See application file for complete search history.

(56) References Cited

U.S. PATENT DOCUMENTS

| 8,287,132 | B2* | 10/2012 | Miyamae | G03B 21/14 353/31 |
| 8,602,562 | B2* | 12/2013 | Miyamae | G03B 33/12 353/20 |
| 8,733,941 | B2* | 5/2014 | Huang | H04N 9/3111 353/31 |
| RE45,033 | E * | 7/2014 | Miyamae | G03B 21/204 353/31 |

(Continued)

FOREIGN PATENT DOCUMENTS

JP 2012-137744 A 7/2012

*Primary Examiner* — Bao-Luan Q Le
(74) *Attorney, Agent, or Firm* — Dority & Manning, P.A.

(57) ABSTRACT

A projector includes a first light modulation device, a second light modulation device, a third light modulation device, a first light source configured to emit excitation light, a fluorescence emitting element which is excited by the excitation light to emit fluorescence toward an incidence side of the excitation light, a first dichroic mirror configured to guide the excitation light to the fluorescence emitting element, and separate the fluorescence emitted from the fluorescence emitting element into first colored light and second colored light, and a second dichroic mirror configured to guide the excitation light to the first dichroic mirror, and reflect the second colored light separated by the first dichroic mirror, wherein the first colored light separated by the first dichroic mirror enters the first light modulation device, and the second colored light reflected by the second dichroic mirror enters the second light modulation device.

20 Claims, 9 Drawing Sheets

(56) References Cited

U.S. PATENT DOCUMENTS

| | | | | |
|---|---|---|---|---|
| 8,827,458 B2* | 9/2014 | Kimura | ................ | G03B 21/20 |
| | | | | 353/31 |
| 9,010,938 B2* | 4/2015 | Akiyama | ............ | G02B 27/149 |
| | | | | 353/34 |
| 9,033,518 B2* | 5/2015 | Pan | .................... | H04N 9/3117 |
| | | | | 353/84 |
| 10,444,611 B2* | 10/2019 | Pan | .................... | G03B 21/2066 |
| 10,564,528 B2* | 2/2020 | Kodama | ............ | H04N 9/3126 |
| 2011/0043761 A1* | 2/2011 | Miyamae | ............ | G03B 21/204 |
| | | | | 353/20 |
| 2011/0043762 A1* | 2/2011 | Miyamae | ............ | G03B 21/204 |
| | | | | 353/20 |
| 2011/0279782 A1* | 11/2011 | Huang | ................ | H04N 9/3164 |
| | | | | 353/31 |
| 2012/0019786 A1* | 1/2012 | Kimura | ................ | G03B 21/20 |
| | | | | 353/31 |
| 2012/0026469 A1* | 2/2012 | Akiyama | ............ | G03B 21/208 |
| | | | | 353/20 |
| 2012/0140183 A1 | 6/2012 | Tanaka et al. | | |
| 2012/0162614 A1* | 6/2012 | Kobayashi | ............ | H04N 9/3164 |
| | | | | 353/31 |
| 2013/0070205 A1* | 3/2013 | Pan | .................... | H04N 9/3117 |
| | | | | 353/31 |
| 2019/0049825 A1* | 2/2019 | Kodama | ............ | G03B 21/2033 |
| 2019/0163043 A1* | 5/2019 | Pan | .................... | G03B 21/204 |
| 2020/0333695 A1* | 10/2020 | Fukui | .................... | G03B 21/14 |

* cited by examiner

PROJECTOR

The present application is based on, and claims priority from JP Application Serial Number 2019-023279, filed Feb. 13, 2019, the disclosure of which is hereby incorporated by reference herein in its entirety.

BACKGROUND

1. Technical Field

The present disclosure relates to a projector.

2. Related Art

In the past, there has been known an illumination device using fluorescence generated by exciting a phosphor with a laser beam. In JP-A-2012-137744, there is disclosed an illumination device for a projector for illuminating liquid crystal light valve using fluorescence.

The illumination device described above has a configuration of disposing a laser source and a phosphor layer on the periphery of a polarization separation dichroic mirror. Therefore, there is a problem that it is difficult to reduce the device configuration in size, and the projector equipped with the illumination device itself is also apt to grow in size.

SUMMARY

According to a first aspect of the present disclosure, there is provided a projector including a first light modulation device, a second light modulation device, a third light modulation device, a first light source configured to emit excitation light, a fluorescence emitting element which is excited by the excitation light to emit fluorescence toward an incidence side of the excitation light, a first dichroic mirror configured to guide the excitation light to the fluorescence emitting element, and separate the fluorescence emitted from the fluorescence emitting element into first colored light and second colored light, and a second dichroic mirror configured to guide the excitation light to the first dichroic mirror, and reflect the second colored light separated by the first dichroic mirror, wherein the first colored light separated by the first dichroic mirror enters the first light modulation device, and the second colored light reflected by the second dichroic mirror enters the second light modulation device.

In the first aspect described above, the projector may further include a reflective polarization plate disposed between the fluorescence emitting element and the first dichroic mirror.

In the first aspect described above, the projector may further include a polarization conversion element disposed between the fluorescence emitting element and the first dichroic mirror, and configured to convert a polarization direction of the fluorescence.

In the first aspect described above, the projector may further include a second light source configured to emit third colored light different in wavelength band from the first colored light and the second colored light toward the third light modulation device.

In the first aspect described above, the first light source may emit third colored light different in wavelength band from the first colored light and the second colored light as the excitation light, and a part of the third colored light may enter the third light modulation device.

In the first aspect described above, the projector may further include a polarization separation mirror having a polarization separation function with respect to the third colored light, wherein the polarization separation mirror may transmit the third colored light proceeding toward the fluorescence emitting element, and may reflect a part of the third colored light reflected by the fluorescence emitting element to guide the part of the third colored light to the third light modulation device.

In the first aspect described above, the fluorescence emitting element may include a phosphor configured to generate the fluorescence, and a function membrane disposed on a surface of the phosphor, and configured to reflect a part of the third colored light and transmit a rest of the third colored light.

DESCRIPTION OF EXEMPLARY EMBODIMENTS

Some embodiments of the present disclosure will hereinafter be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

First Embodiment

Figure 1:
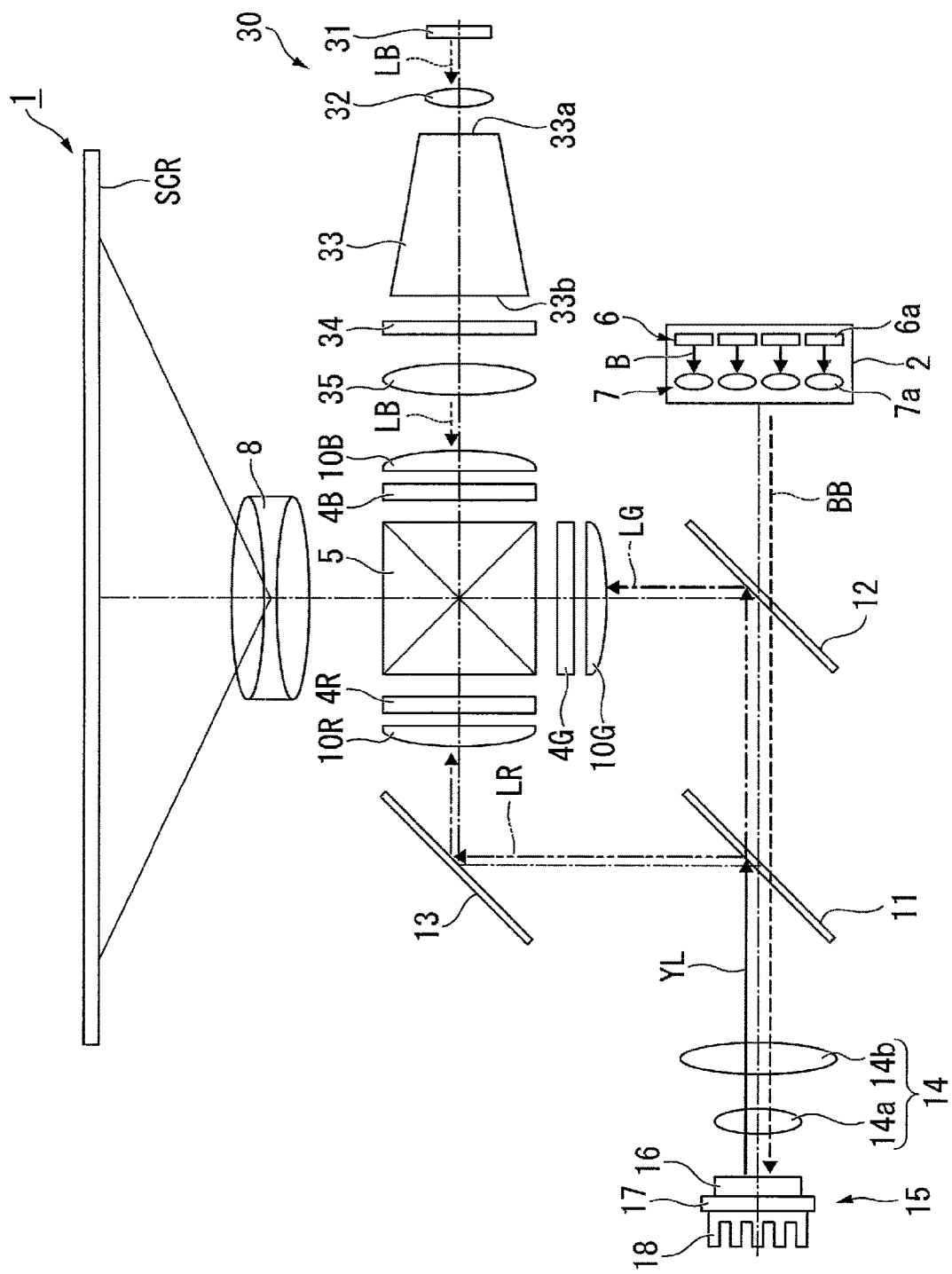
FIG. 1 is a schematic configuration diagram of a projector according to a first embodiment.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with an excitation light source (a first light source) 2, a first dichroic mirror 11, a second dichroic mirror 12, a mirror 13, a pickup optical system 14, a fluorescence emitting element 15, a blue light source (a second light source) 30, a light modulation device (a first light modulation device) 4R, a light modulation device (a second light modulation device) 4G, a light modulation device (a third light modulation device) 4B, a combining optical system 5, and a projection optical device 8.

The blue light source 30 emits blue light (third colored light) LB with a peak wavelength of, for example, 440 nm through 470 nm toward the light modulation device 4B. The blue light source 30 has a light source section 31, a collecting lens 32, a light guide 33, a reflective polarization plate 34, and a collimating lens 35.

The light source section 31 is formed of a laser element for emitting the blue light LB with the peak wavelength band of, for example, 440 nm through 470 nm. The collecting lens 32 collects the blue light LB to make the blue light LB enter the light guide 33. The light guide 33 emits a part of the light having propagated inside the light guide 33 from a light exit surface 33b while propagating the light having entered the inside from a plane of incidence of light 33a with total reflection. The light guide 33 is formed of a rod extending in a central axis direction.

The light guide 33 in the present embodiment has a taper shape in which the cross-sectional area perpendicular to the central axis expands in a direction from the plane of incidence of light 33a toward the light exit surface 33b. The light guide 33 in the present embodiment is formed of a taper rod having a shape the side surface of which is tilted with respect to the plane of incidence of light 33a and the light exit surface 33b.

The light guide 33 is formed of a light transmissive material such as optical glass including borosilicate glass such as BK7, quartz glass, and synthetic silica glass, quartz crystal, or sapphire.

Further, the blue light LB having entered the light guide 33 propagates in the light guide 33 while being totally reflected to thereby be emitted from the light exit surface 33b in the state in which the homogeneity of the illuminance distribution is improved. The blue light LB enhanced in the homogeneity of the illuminance distribution by the light guide 33 enters the reflective polarization plate 34.

Further, the blue light LB proceeding inside the light guide 33 is converted in angle every time the blue light LB is reflected by each of the side surfaces having the taper shape, and is therefore emitted as substantially collimated light when emitted from the light exit surface 33b. According to the light guide 33 in the present embodiment, since the taper shape is adopted, the blue light LB can substantially be collimated and then emitted from the light exit surface 33b.

The reflective polarization plate 34 has a function of performing polarization separation on the blue light LB having been emitted from the light exit surface 33b of the light guide 33. Specifically, the reflective polarization plate 34 reflects the polarization component different in direction from the transmission axis of the reflective polarization plate 34 out of the blue light LB, and transmits the polarization component the same in direction as the transmission axis of the reflective polarization plate 34 out of the blue light LB. In the present embodiment, the transmission axis direction of the reflective polarization plate 34 coincides with the transmission axis direction of the polarization plate disposed on the light incidence side of the light modulation device 4B.

The reflective polarization plate 34 is formed of, for example, a wire grid polarizer. It should be noted that the reflective polarization plate 34 can also be formed of a reflective polarization plate of an organic, inorganic, or crystalline type providing the polarization separation characteristic described above is provided.

The P-polarized light of the blue light LB is transmitted through the reflective polarization plate 34. Meanwhile, the S-polarization component of the blue light LB is reflected by the reflective polarization plate 34 to be returned to the inside of the light guide 33. The S-polarization component reflected by the reflective polarization plate 34 propagates inside the light guide 33 with the total reflection to thereby be emitted from the light exit surface 33b to enter the reflective polarization plate 34.

Here, the blue light LB reflected by the reflective polarization plate 34 changes to a different polarization state (unpolarized light) at the moment of the reflection. Therefore, the P-polarization component of the blue light LB reflected inside the light guide 33 can be reused by the reflective polarization plate 34 as the blue light LB.

As described above, according to the blue light source 30 in the present embodiment, since a part of the blue light LB reflected by the reflective polarization plate 34 is uniformed in polarization direction to thereby be reused as the illumination light, it is possible to realize high light use efficiency. The blue light LB emitted from the reflective polarization plate 34 is collimated by the collimating lens 35 and is then guided to the light modulation device 4B.

Since the transmission axis direction of the reflective polarization plate 34 coincides with the transmission axis direction of the polarization plate disposed on the light incidence side of the light modulation device 4B as described above, the blue light LB emitted from the reflective polarization plate 34 efficiently enters the light modulation device 4B.

The excitation light source 2 includes a blue array light source 6 and a collimator optical system 7. The blue array light source 6 has a plurality of blue laser emitting elements 6a. The plurality of blue laser emitting elements 6a is arranged in an array in a plane perpendicular to the optical axis. The blue laser emitting elements 6a each emit, for example, a blue light beam B with the peak wavelength band of 440 nm through 470 nm.

The plurality of light beams B emitted from the blue array light source 6 enters the collimator optical system 7. The collimator optical system 7 converts the plurality of light beams B emitted from the blue array light source 6 into parallel light beams. The collimator optical system 7 is constituted by, for example, a plurality of collimator lenses 7a arranged side by side in an array. The plurality of collimator lenses 7a is disposed so as to correspond respectively to the plurality of blue laser emitting elements 6a.

Based on such a configuration, the excitation light source 2 is arranged to emit excitation light BB constituted by the plurality of light beams B formed of the parallel light toward the fluorescence emitting element 15.

The excitation light BB emitted from the excitation light source 2 enters the second dichroic mirror 12. The second dichroic mirror 12 transmits the excitation light BB to thereby guide the excitation light BB to the dichroic mirror 11. The first dichroic mirror 11 transmits the excitation light BB to thereby guide the excitation light BB to the fluorescence emitting element 15.

The excitation light BB transmitted by the first dichroic mirror 11 enters the pickup optical system 14. The pickup optical system 14 is constituted by, for example, a first lens 14a and a second lens 14b. The excitation light BB emitted from the pickup optical system 14 enters the fluorescence emitting element 15 in a converged state.

The fluorescence emitting element 15 has a phosphor 16, a substrate 17 for supporting the phosphor 16, and a heatsink 18. The phosphor 16 includes a phosphor which absorbs the excitation light BB to thereby be excited. The phosphor 16 is formed of, for example, a YAG:Ce phosphor. The phosphor excited by the excitation light BB emits the fluorescence (yellow fluorescence) YL in the wavelength band of, for example, 500 through 700 nm.

On the opposite side of the phosphor 16 to the side which the excitation light BB enters, there is disposed a reflecting section not shown. The reflecting section reflects a component proceeding toward the substrate 17 out of the fluorescence YL generated by the phosphor 16.

On a surface of the substrate 17 on the opposite side to the surface for supporting the phosphor 16, there is disposed the heatsink 18. In the fluorescence emitting element 15, since heat radiation can be achieved via the heatsink 18, the deterioration by heat of the phosphor 16 can be prevented.

A part of the fluorescence YL generated by the phosphor 16 is reflected by the reflecting section, and is then emitted to the outside of the phosphor 16. Further, another part of the fluorescence YL generated by the phosphor 16 is emitted directly to the outside of the phosphor 16 without the intervention of the reflecting section. In such a manner as described above, the fluorescence YL is emitted from the phosphor 16. In the present embodiment, the fluorescence emitting element 15 emits the fluorescence YL toward the incidence side of the excitation light BB. In other words, the fluorescence emitting element 15 in the present embodiment is a reflective-type fluorescence emitting element.

The fluorescence YL emitted from the fluorescence emitting element 15 is collimated by the pickup optical system 14, and then enters the first dichroic mirror 11. The first dichroic mirror 11 separates the fluorescence YL into red light (first colored light) LR and green light (second colored light) LG. Specifically, the first dichroic mirror 11 reflects the red light LR and transmits the green light LG to thereby separate the fluorescence YL into two colored light.

The red light LR reflected by the first dichroic mirror 11 is reflected by the mirror 13, and then enters the light modulation device 4R. Further, the green light LG transmitted through the first dichroic mirror 11 enters the second dichroic mirror 12. The second dichroic mirror 12 reflects the green light LG toward the light modulation device 4G. As described above, the second dichroic mirror 12 has a property of transmitting the excitation light BB, and at the same time reflecting the green light LG separated from the fluorescence YL.

As described above, according to the projector 1 related to the present embodiment, since the first dichroic mirror 11 and the second dichroic mirror 12 are provided, it is possible for a part of an illumination optical system for guiding the fluorescence YL to the light modulation devices 4R, 4G to function also as an excitation optical system for guiding the excitation light BB to the phosphor 16.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incidence side and the exit side of each of the liquid crystal panels, there are respectively disposed polarization plates not shown. Hereinafter, the light modulation device 4R, the light modulation device 4G and the light modulation device 4B are simply referred to as the light modulation devices 4R, 4G, and 4B.

Further, on the incidence side of the light modulation devices 4R, 4G, and 4B, there are respectively disposed a field lens 10R, a field lens 10G, and a field lens 10B. The field lens 10R, the field lens 10G, and the field lens 10B respectively make the red light LR, the green light LG, and the blue light LB entering the respective light modulation devices 4R, 4G, and 4B telecentric.

The image light from each of the light modulation devices 4R, 4G, and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical device 8. As the combining optical system 5, there is used, for example, a cross dichroic prism.

The projection optical device 8 is constituted by a projection lens group, and projects the image light combined by the combining optical system 5 toward the screen SCR in an enlarged manner. Thus, the color image enlarged is displayed on the screen SCR.

As described hereinabove, according to the projector 1 in the present embodiment, by adopting the configuration in which a part of the illumination optical system for guiding the fluorescence YL to the light modulation devices 4R, 4G also functions as the excitation optical system for guiding the excitation light BB to the phosphor 16, it is possible to achieve reduction in size of the device configuration.

Second Embodiment

Then, a projector according to a second embodiment will be described. It should be noted that configurations and members common to the first embodiment and the present embodiment will be denoted by the same reference symbols, and the detailed description thereof will be omitted.

Figure 2:
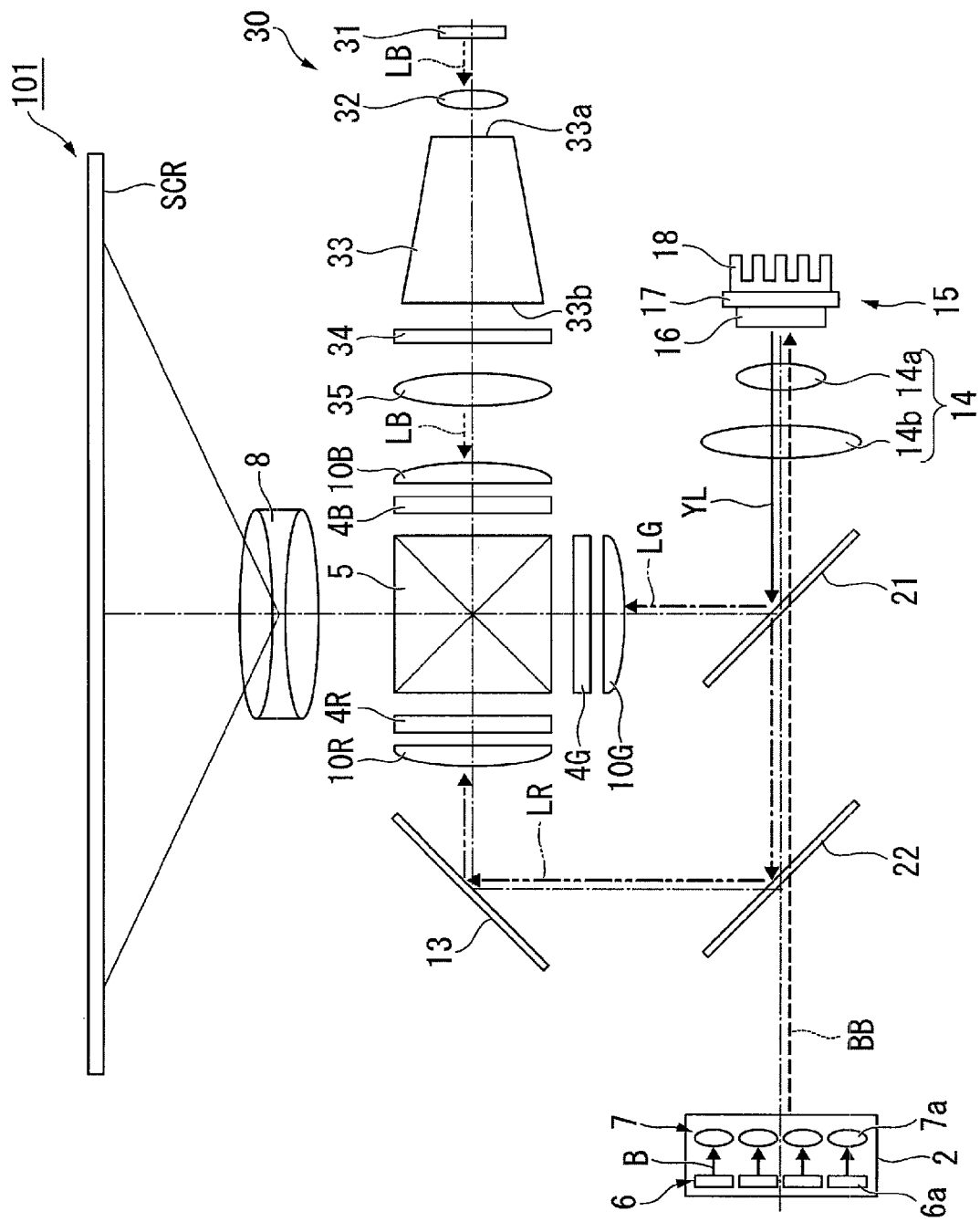
FIG. 2 is a schematic configuration diagram of a projector according to a second embodiment.

FIG. 2 is a schematic configuration diagram of the projector according to the present embodiment.

As shown in FIG. 2, the projector 101 according to the present embodiment is provided with the excitation light source 2, a first dichroic mirror 21, a second dichroic mirror 22, the mirror 13, the pickup optical system 14, the fluorescence emitting element 15, the blue light source 30, the light modulation device (the second light modulation device) 4R, the light modulation device (the first light modulation device) 4G, the light modulation device (the third light modulation device) 4B, the combining optical system 5, and the projection optical device 8.

In the projector 101 according to the present embodiment, the positions of the excitation light source 2 and the fluorescence emitting element 15 are exchanged for each other with respect to the configuration of the projector 1 according to the first embodiment.

In the present embodiment, the excitation light BB emitted from the excitation light source 2 enters the second dichroic mirror 22. The second dichroic mirror 22 transmits the excitation light BB to thereby guide the excitation light BB to the first dichroic mirror 21. The first dichroic mirror 21 transmits the excitation light BB to thereby guide the excitation light BB to the fluorescence emitting element 15.

The fluorescence YL emitted from the fluorescence emitting element 15 is collimated by the pickup optical system 14, and then enters the first dichroic mirror 21. The first dichroic mirror 21 separates the fluorescence YL into the green light (first colored light) LG and the red light (second colored light) LR. Specifically, the first dichroic mirror 21 reflects the green light LG and transmits the red light LR to thereby separate the fluorescence YL into two colored light.

The green light LG reflected by the first dichroic mirror 21 enters the light modulation device 4G. Further, the red light LR transmitted through the first dichroic mirror 21 enters the second dichroic mirror 22. The second dichroic mirror 22 reflects the red light LR toward the mirror 13, and the mirror 13 reflects the red light LR toward the light modulation device 4R. As described above, the second dichroic mirror 22 has a property of transmitting the excitation light BB, and at the same time reflecting the red light LR separated from the fluorescence YL.

As described above, also in the projector 101 according to the present embodiment, since the first dichroic mirror 21 and the second dichroic mirror 22 are provided, it is possible to achieve reduction in size of the device configuration by a part of an illumination optical system for guiding the fluorescence YL to the light modulation devices 4R, 4G also functioning as the excitation optical system for guiding the excitation light BB to the phosphor 16.

Third Embodiment

Then, a projector according to a third embodiment will be described. It should be noted that configurations and members common to the first embodiment and the present embodiment will be denoted by the same reference symbols, and the detailed description thereof will be omitted.

Figure 3:
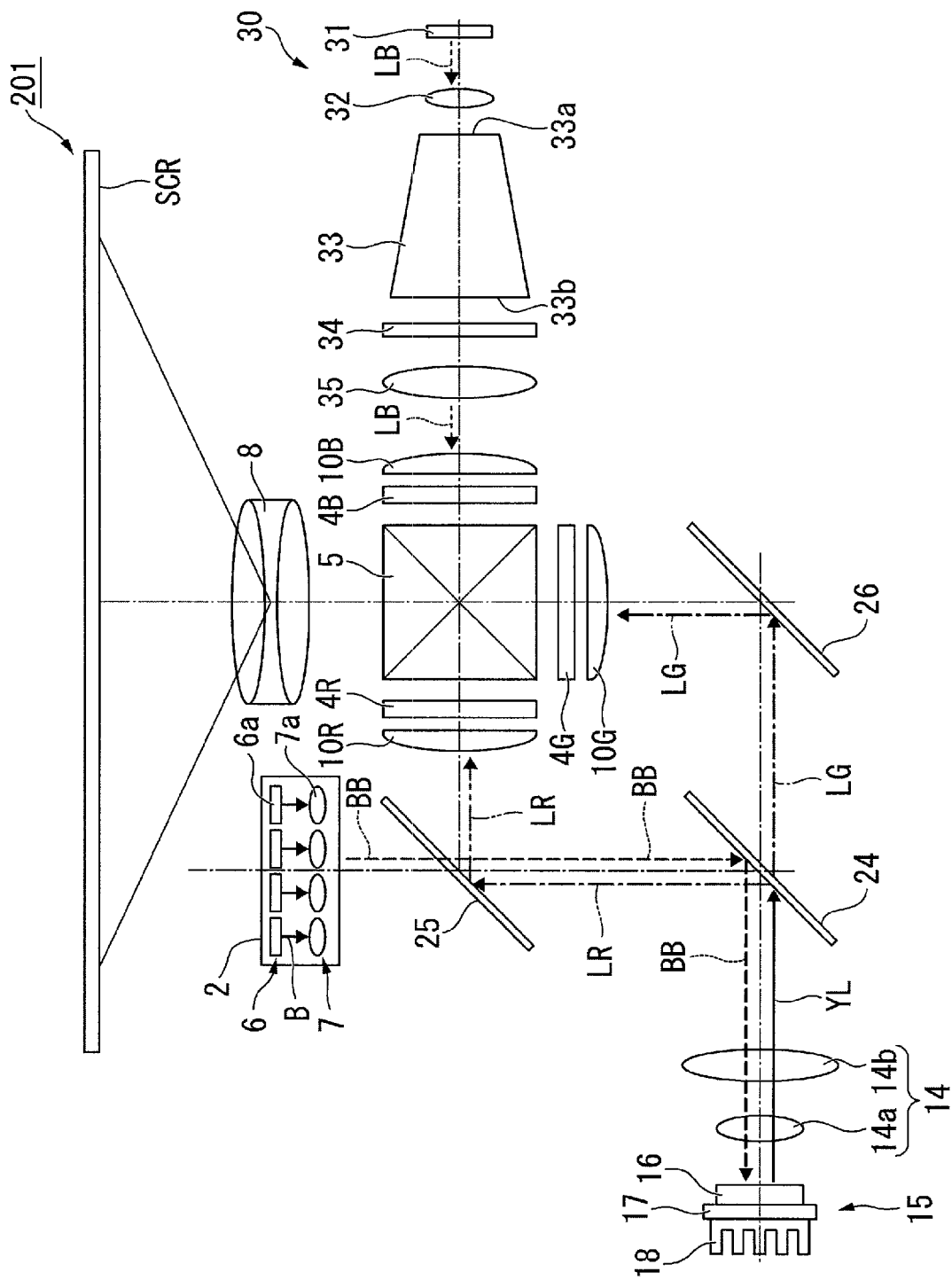
FIG. 3 is a schematic configuration diagram of a projector according to a third embodiment.

FIG. 3 is a schematic configuration diagram of the projector according to the present embodiment.

As shown in FIG. 3, the projector 201 according to the present embodiment is provided with the excitation light source 2, a first dichroic mirror 24, a second dichroic mirror 25, a mirror 26, the pickup optical system 14, the fluorescence emitting element 15, the blue light source 30, the light modulation device (the second light modulation device) 4R, the light modulation device (the first light modulation device) 4G, the light modulation device (the third light modulation device) 4B, the combining optical system 5, and the projection optical device 8.

In the projector 201 according to the present embodiment, the position of the excitation light source 2 is changed with respect to the configuration of the projector 1 according to the first embodiment.

In the present embodiment, the excitation light BB emitted from the excitation light source 2 enters the second dichroic mirror 25. The second dichroic mirror 25 transmits the excitation light BB to thereby guide the excitation light BB to the first dichroic mirror 24. The first dichroic mirror 24 reflects the excitation light BB to thereby guide the excitation light BB to the fluorescence emitting element 15.

The fluorescence YL emitted from the fluorescence emitting element 15 is collimated by the pickup optical system 14, and then enters the first dichroic mirror 24. The first dichroic mirror 24 separates the fluorescence YL into the green light (the first colored light) LG and the red light (the second colored light) LR. Specifically, the first dichroic mirror 21 transmits the green light LG and reflects the red light LR to thereby separate the fluorescence YL into two colored light.

The green light LG transmitted through the first dichroic mirror 24 is reflected by the mirror 26, and then enters the light modulation device 4G. Further, the red light LR reflected by the first dichroic mirror 24 enters the second dichroic mirror 25. The second dichroic mirror 25 reflects the red light LR toward the light modulation device 4R. As described above, the second dichroic mirror 25 has a property of transmitting the excitation light BB, and at the same time reflecting the red light LR separated from the fluorescence YL.

As described above, also in the projector 201 according to the present embodiment, since the first dichroic mirror 24 and the second dichroic mirror 25 are provided, it is possible to achieve reduction in size of the device configuration by a part of an illumination optical system for guiding the fluorescence YL to the light modulation devices 4R, 4G also functioning as the excitation optical system for guiding the excitation light BB to the phosphor 16.

Fourth Embodiment

Then, a projector according to a fourth embodiment will be described. It should be noted that configurations and members common to the first embodiment and the present embodiment will be denoted by the same reference symbols, and the detailed description thereof will be omitted.

Figure 4:
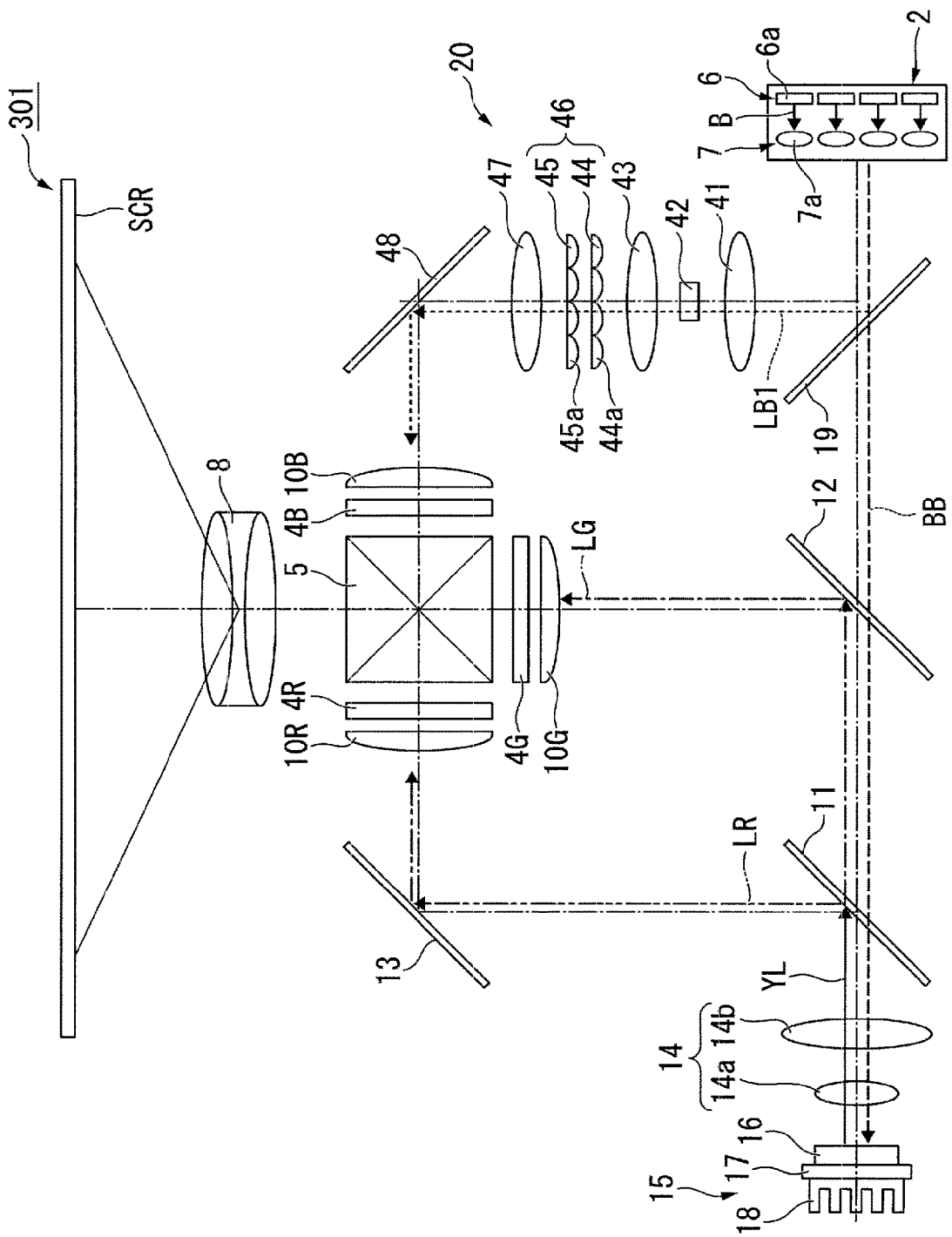
FIG. 4 is a schematic configuration diagram of a projector according to a fourth embodiment.

FIG. 4 is a schematic configuration diagram of the projector according to the present embodiment.

As shown in FIG. 4, the projector 301 according to the present embodiment is provided with the excitation light source 2, the first dichroic mirror 11, the second dichroic mirror 12, the mirror 13, the pickup optical system 14, the fluorescence emitting element 15, a half mirror 19, a light guide optical system 20, the light modulation device (the first light modulation device) 4R, the light modulation device (the second light modulation device) 4G, the light modulation device (the third light modulation device) 4B, the combining optical system 5, and the projection optical device 8.

The excitation light BB emitted from the excitation light source 2 is blue light with the peak wavelength band of 440 nm through 470 nm. In other words, as the excitation light BB, the excitation light source 2 emits the blue light (the third colored light) different in wavelength band from the red light LR and the green light LG. Therefore, it is possible for the excitation light BB to preferably be used to generate the image light in the light modulation device 4B. In the projector 301 according to the present embodiment, a part of the excitation light BB emitted from the excitation light source 2 is made to directly enter the light modulation device 4B to thereby omit the blue light source 30.

In the present embodiment, the excitation light BB emitted from the excitation light source 2 enters the half mirror 19 to be divided into two. Specifically, a part of the excitation light BB transmitted through the half mirror 19 is guided to the fluorescence emitting element 15 to thereby generate the fluorescence YL similarly to the first embodiment.

Meanwhile, a part of the excitation light BB reflected by the half mirror 19 is guided by the light guide optical system 20 to the light modulation device 4B as blue light LB1. The light guide optical system 20 has a collection lens 41, a diffuser plate 42, a pickup lens 43, an integrator optical system 46, a superimposing lens 47, and a mirror 48.

In the present embodiment, the polarization direction of the excitation light BB as linearly polarized light coincides with the transmission axis direction of the polarization plate disposed on the light incidence side of the light modulation device 4B. Therefore, the blue light LB1 as a part of the excitation light BB reflected by the half mirror 19 is transmitted through the incidence side polarization plate, and then efficiently enters the light modulation device 4B.

The collecting lens 41 collects the blue light LB1 to make the blue light LB1 enter the diffuser plate 42. The diffuser plate 42 diffuses the blue light LB1 to thereby homogenize the illuminance distribution of the blue light LB1 consisting of the laser beam. The pickup lens 43 picks up the blue light LB1 diffused by the diffuser plane 42 to thereby collimate the blue light LB1. The integrator optical system 46 includes a first multi-lens array 44 and a second multi-lens array 45. The mirror 48 reflects the blue light LB1 propagated via the integrator optical system 46 to guide the blue light LB1 to the light modulation device 4B.

The first multi-lens array 44 is configured by arranging, for example, a plurality of first small lenses 44a in a planar fashion. The first multi-lens array 44 divides the blue light LB1 into a plurality of small light beams with the respective first small lenses 44a to converge the respective small light beams.

The second multi-lens array 45 has a plurality of second small lenses 45a arranged in a planar fashion so as to correspond to the respective first small lenses 44a of the first multi-lens array 44. In the present embodiment, the second multi-lens array 45 makes images of the first small lenses 44a of the first multi-lens array 44 enter a pixel forming area of the light modulation device 4B in a superimposed manner together with the superimposing lens 47 described later.

As described hereinabove, also in the projector 301 according to the present embodiment, by a part of the illumination optical system for guiding the fluorescence YL to the light modulation devices 4R, 4G also functioning as the excitation optical system for guiding the excitation light BB to the phosphor 16, it is possible to achieve reduction in size of the device configuration. Further, in the projector 301 according to the present embodiment, by making the blue light LB1 as a part of the excitation light BB enter the light modulation device 4B, it is possible to generate the blue image light. Thus, it becomes unnecessary to separately dispose the blue light source 30 for making the light enter the light modulation device 4B, it is possible to achieve reduction in cost.

Fifth Embodiment

Then, a projector according to a fifth embodiment will be described. It should be noted that configurations and members common to the first embodiment and the present embodiment will be denoted by the same reference symbols, and the detailed description thereof will be omitted.

Figure 5:
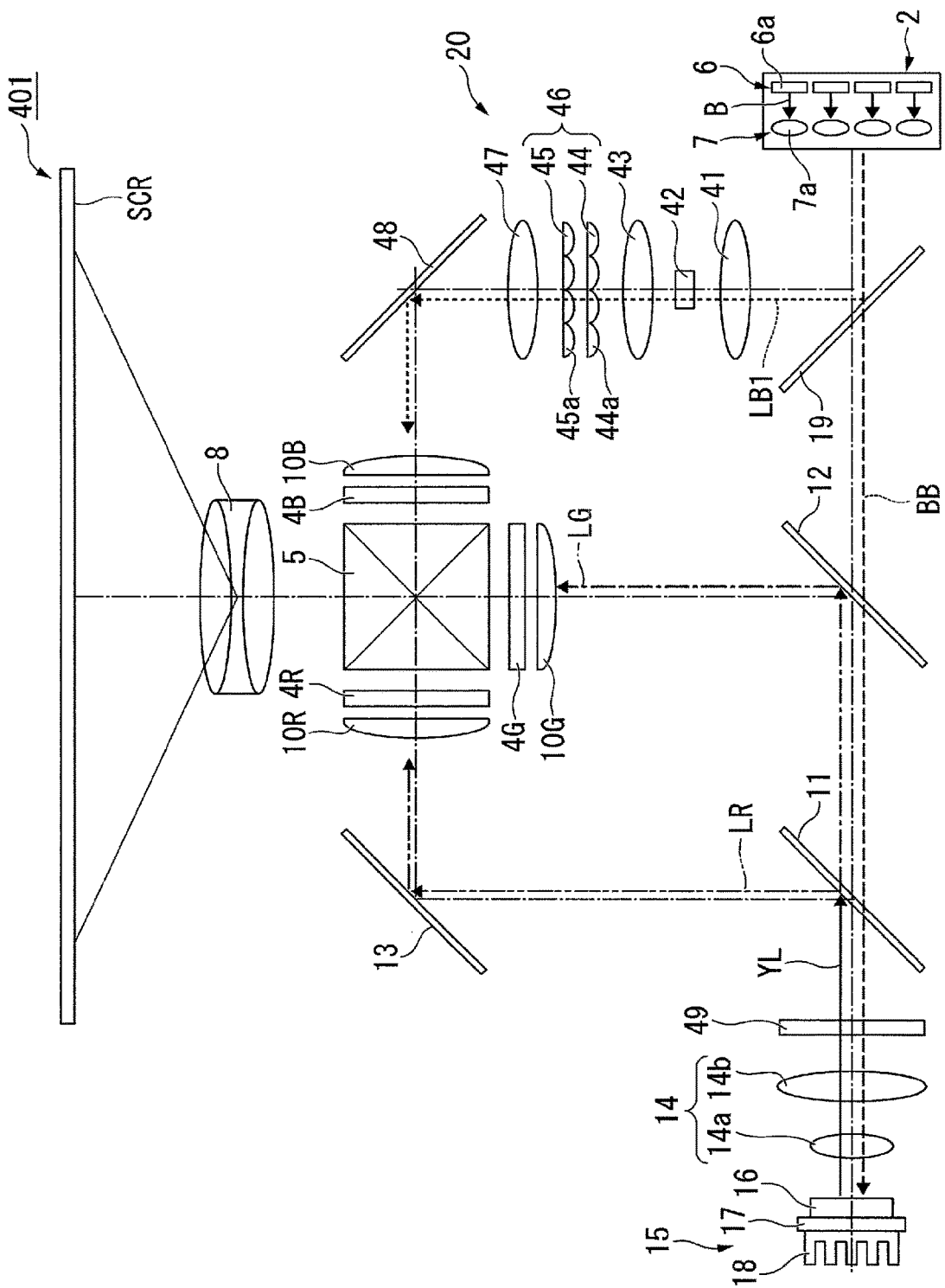
FIG. 5 is a schematic configuration diagram of a projector according to a fifth embodiment.

FIG. 5 is a schematic configuration diagram of the projector according to the present embodiment.

As shown in FIG. 5, the projector 401 according to the present embodiment is provided with the excitation light source 2, the first dichroic mirror 11, the second dichroic mirror 12, the mirror 13, the pickup optical system 14, the fluorescence emitting element 15, a reflective polarization plate 49, the half mirror 19, the light guide optical system 20, the light modulation device 4R, the light modulation device 4G, the light modulation device 4B, the combining optical system 5, and the projection optical device 8.

The projector 401 according to the present embodiment is different in the point that the reflective polarization plate 49 is added to the configuration of the projector 301 according to the fourth embodiment.

In the present embodiment, the fluorescence YL collimated by the pickup optical system 14 enters the reflective polarization plate 49 disposed between the fluorescence emitting element 15 and the first dichroic mirror 11. The reflective polarization plate 49 has a function of performing the polarization separation on the fluorescence YL. The reflective polarization plate 49 is formed of, for example, a wire grid polarizer.

The fluorescence YL is unpolarized light. Specifically, the reflective polarization plate 49 reflects the polarization component different in direction from the transmission axis of the reflective polarization plate 49 out of the fluorescence YL, and transmits the polarization component the same in direction as the transmission axis of the reflective polarization plate 49 out of the fluorescence YL. In the present embodiment, the transmission axis direction of the reflective polarization plate 49 coincides with the transmission axis direction of the polarization plate disposed on the light incidence side of the light modulation devices 4R, 4G. It should be noted that the polarization direction of the excitation light BB coincides with the transmission axis direction of the reflective polarization plate 49. Therefore, the excitation light BB is transmitted through the reflective polarization plate 49, and then efficiently enters the fluorescence emitting element 15.

The component of the fluorescence YL reflected by the reflective polarization plate 49 returns to the phosphor 16, and then reenters the reflective polarization plate 49 in the polarization state which is disturbed by the reflection inside the phosphor 16. In such a manner, it is possible for the reflective polarization plate 49 to emit the fluorescence YL with the polarization direction uniformed in a predetermined direction.

The fluorescence YL emitted from the reflective polarization plate 49 in such a manner is converted into linearly polarized light in the predetermined polarization direction. Since the polarization direction of the red light LR separated by the first dichroic mirror 11 coincides with the transmission axis direction of the polarization plate disposed on the light incidence side of the light modulation device 4R, the red light LR efficiently enters the light modulation device 4R. Further, since the polarization direction of the green light LG separated by the first dichroic mirror 11 coincides with the transmission axis direction of the polarization plate disposed on the light incidence side of the light modulation device 4G, the green light LG efficiently enters the light modulation device 4G.

As described above, according to the projector 401 related to the present embodiment, it is possible to achieve reduction in size of the device configuration similarly to the projector 301 according to the fourth embodiment. Further, in the projector 401 according to the present embodiment, by converting the fluorescence YL into the linearly polarized light with the reflective polarization plate 49, it is possible to make the red light LR and the green light LG obtained by separating the fluorescence YL efficiently enter the light modulation devices 4R, 4G.

Sixth Embodiment

Then, a projector according to a sixth embodiment will be described. It should be noted that configurations and members common to the first embodiment and the present embodiment will be denoted by the same reference symbols, and the detailed description thereof will be omitted.

Figure 6:
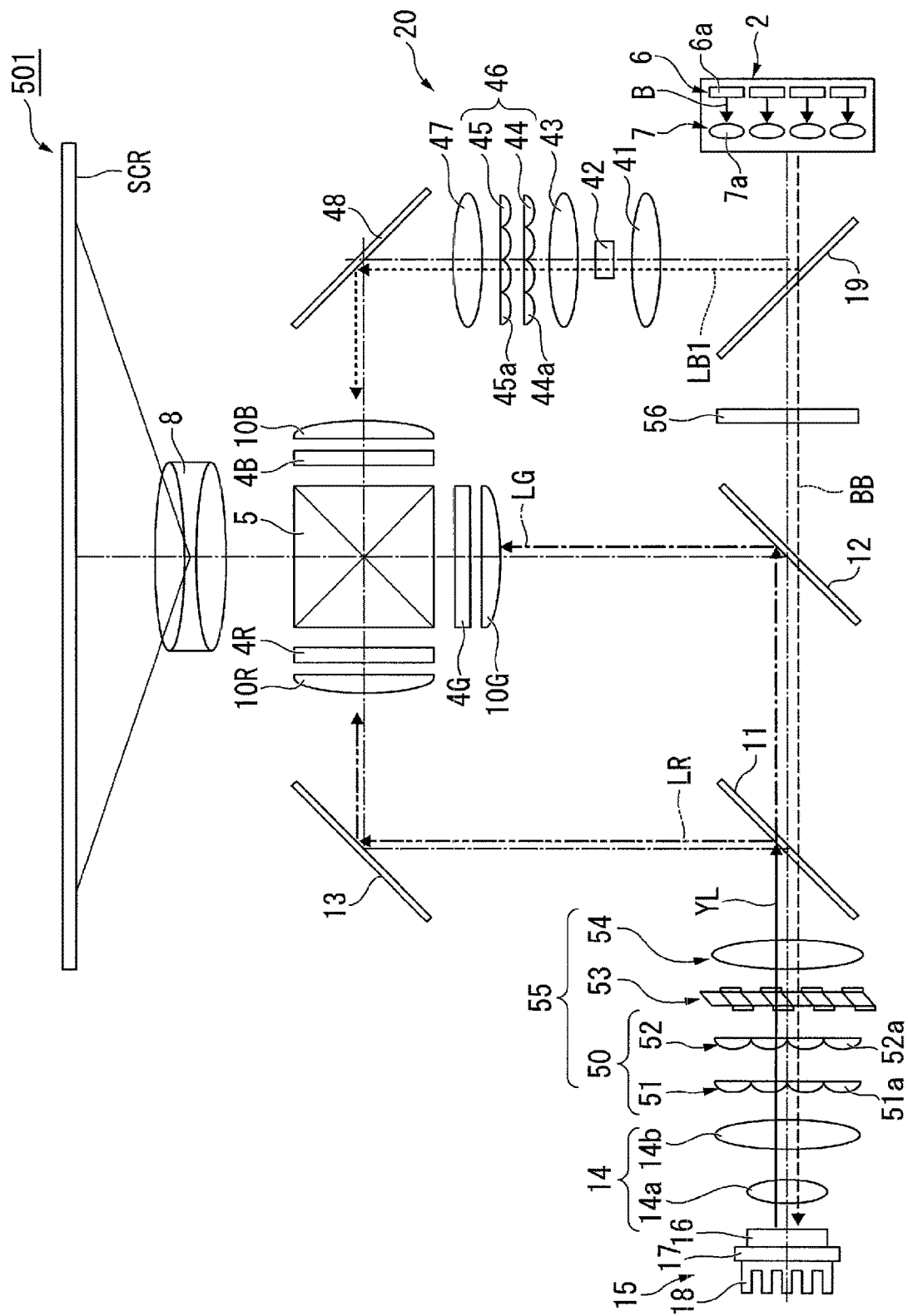
FIG. 6 is a schematic configuration diagram of a projector according to a sixth embodiment.

FIG. 6 is a schematic configuration diagram of the projector according to the present embodiment.

As shown in FIG. 6, the projector 501 according to the present embodiment is provided with the excitation light source 2, the first dichroic mirror 11, the second dichroic mirror 12, the mirror 13, the pickup optical system 14, the fluorescence emitting element 15, a homogenous illumination optical system 55, the half mirror 19, a diffuser plate 56, the light guide optical system 20, the light modulation device 4R, the light modulation device 4G, the light modulation device 4B, the combining optical system 5, and the projection optical device 8.

The projector 501 according to the present embodiment is different in the point that the homogenous illumination optical system 55 and the diffuser plate 56 are added to the configuration of the projector 301 according to the fourth embodiment.

The homogenous illumination optical system 55 homogenizes on each of the light modulation devices 4R, 4G of the red light LR and the green light LG obtained by separating the fluorescence YL. The homogenous illumination optical system 55 is provided with an integrator optical system 50, a polarization conversion element 53, and a superimposing lens 54. The integrator optical system 50 includes a first multi-lens array 51 and a second multi-lens array 52.

The first multi-lens array 51 is configured by arranging, for example, a plurality of first small lenses 51*a* in a planar fashion. The first multi-lens array 51 divides the fluorescence YL into a plurality of small light beams with the respective first small lenses 51*a* to converge the respective small light beams.

The second multi-lens array 52 has a plurality of second small lenses 52*a* arranged in a planar fashion so as to correspond to the respective first small lenses 51*a* of the first multi-lens array 51. In the present embodiment, the second multi-lens array 52 makes images of the first small lenses 51*a* of the first multi-lens array 51 enter a pixel forming area of the light modulation devices 4R, 4G in a superimposed manner together with the superimposing lens 54.

The polarization conversion element 53 uniforms the polarization direction of the fluorescence YL in one direction.

Figure 7A:
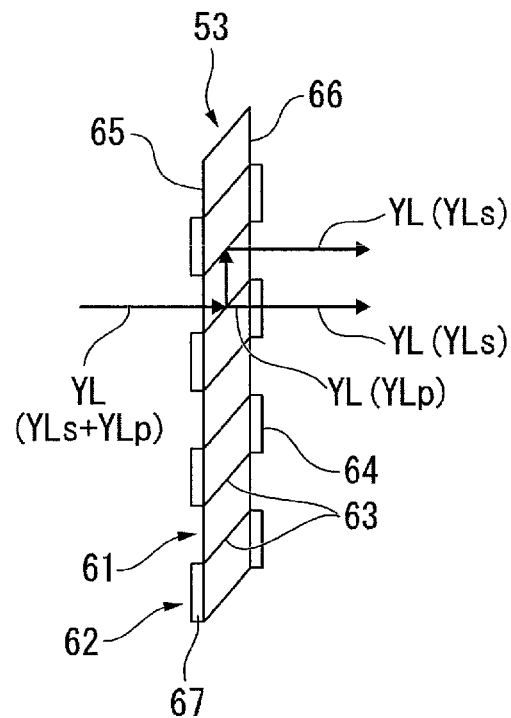
FIG. 7A is a diagram for explaining a configuration and a function of a polarization conversion element.
Figure 7B:
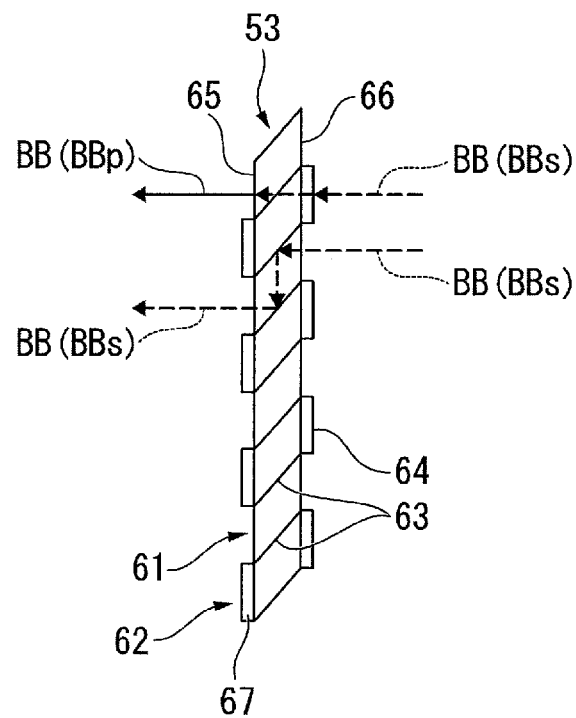
FIG. 7B is a diagram for explaining a configuration and a function of a polarization conversion element.

FIG. 7A and FIG. 7B are each a diagram for explaining a configuration and a function of the polarization conversion element 53.

Specifically, as shown in FIG. 7A and FIG. 7B, the polarization conversion element 53 is disposed in a direction crossing the direction in which the fluorescence YL propagates so that first areas 61 and second areas 62 are alternately adjacent to each other. The first areas 61 are arranged so as to correspond to an arrangement pitch of the second small lenses 52*a* of the second multi-lens array 52. Therefore, the fluorescence YL emitted from the second multi-lens array 52 efficiently enters the polarization conversion element 53 from the first areas 61. The second areas 62 are each an area for blocking stray light, and each have a light blocking mask 67. The first areas 61 are each a light incidence area for acquiring the fluorescence YL inside the polarization conversion element 53.

The polarization conversion element 53 is provided with polarization separation layers 63 and retardation layers 64. The polarization conversion element 53 has a plane of incidence of light 65 which the fluorescence YL enters, and a light exit surface 66 for emitting the fluorescence YL. The polarization separation layers 63 are each disposed in a state of being tilted with respect to the plane of incidence of light 65 and the light exit surface 66. The polarization separation layer 63 each transmit the P-polarization component included in the fluorescence YL, and each reflect the S-polarization component included in the fluorescence YL. As the polarization separation layer 63, there is used, for example, a dielectric multilayer film.

The retardation layers 64 are disposed in the areas opposed to the first areas 61 of the light exit surface 66. The retardation layers 64 each provide a phase difference as much as a half wavelength to the P-polarization component YLp included in the fluorescence YL transmitted through the polarization separation layer 63. Thus, the retardation layers 64 each convert the P-polarization component YLp of the fluorescence YL transmitted through the polarization separation layer 63 into the S-polarization component YLs.

The S-polarization component YLs included in the fluorescence YL having entered the polarization conversion element 53 from the first area 61 is reflected twice by a pair of polarization separation layers 63 to thereby be emitted from the light exit surface 66 to the outside. On this occasion, the S-polarization component YLs does not go through the retardation layer 64, and is therefore not provided with the phase difference. Therefore, the S-polarization component YLs included in the fluorescence YL is emitted from the polarization conversion element 53 as the S-polarization component YLs without modification.

The fluorescence YL as unpolarized light goes through the polarization conversion element 53 to thereby be converted into the light of the S-polarization component YLs. In the present embodiment, the polarization direction of the S-polarization component YLs of the fluorescence YL coincides with the transmission axis direction of the polarization plate disposed on the light incidence side of the light modulation devices 4R, 4G.

The fluorescence YL converted into the S-polarized light is separated by the first dichroic mirror 11 into the red light LR and the green light LG. Since the polarization direction of the red light LR separated by the first dichroic mirror 11 coincides with the transmission axis direction of the polarization plate disposed on the light incidence side of the light modulation device 4R, the red light LR efficiently enters the light modulation device 4R. Further, since the polarization direction of the green light LG separated by the first dichroic mirror 11 coincides with the transmission axis direction of the polarization plate disposed on the light incidence side of the light modulation device 4G, the green light LG efficiently enters the light modulation device 4G.

Subsequently, a light path of the excitation light BB will be described. A part of the excitation light BB transmitted through the half mirror 19 is diffused by the diffuser plate 56 so as to spread to the entire light path of the homogenous illumination optical system 55. The superimposing lens 54 collimates the excitation light BB diffused by the diffuser plate 56, and then guides the excitation light BB to the polarization conversion element 53. In the present embodiment, the excitation light BB is linear polarized light which corresponds to an S-polarization component BBs with respect to the polarization separation layers 63 in the polarization conversion element 53, and which coincides with the transmission axis direction of the polarization plate disposed on the light incidence side of the light modulation devices 4R, 4G.

As shown in FIG. 7B, the excitation light BB enters the light exit surface 66 of the polarization conversion element 53 as the S-polarization component BBs. The excitation light BB having entered the retardation layer 64 of the light exit surface 66 is provided with the phase difference as much as a half wavelength to thereby be converted into the P-polarization component BBp. Further, the excitation light BB having entered the area where the retardation layer 64 is not disposed out of the light exit surface 66 is reflected twice by the pair of polarization separation layers 63 to thereby be emitted from the first area 61 while being kept as the S-polarization component BBs.

The excitation light BB is transmitted through the polarization conversion element 53 to thereby be converted into the polarization state in which the P-polarized light and the S-polarized light are mixed with each other, and is transmitted through the integrator optical system 50 in an opposite direction to the proceeding direction of the fluorescence YL to thereby go through the pickup optical system 14 and is then superimposed on the phosphor 16 of the fluorescence emitting element 15. According to the homogenous illumination optical system. 55 in the present embodiment, it is possible to improve the fluorescence emission efficiency by homogenizing the illumination distribution of the phosphor 16 in the excitation light BB to decrease the light density of the excitation light BB.

As described above, according to the projector 501 related to the present embodiment, it is possible to achieve reduction in size of the device configuration similarly to the projector 301 according to the fourth embodiment. Further, in the projector 501 according to the present embodiment, by converting the fluorescence YL into the linearly polarized light with the homogenous illumination optical system 55 including the polarization conversion element 53, it is possible to make the red light LR and the green light LG obtained by separating the fluorescence YL efficiently enter the light modulation devices 4R, 4G. Further, by decreasing the light density of the excitation light BB entering the phosphor 16 with the homogenous illumination optical system 55, it is possible to generate the fluorescence YL high in luminance.

Seventh Embodiment

Then, a projector according to a seventh embodiment will be described. It should be noted that configurations and members common to the first embodiment and the present embodiment will be denoted by the same reference symbols, and the detailed description thereof will be omitted.

Figure 8:
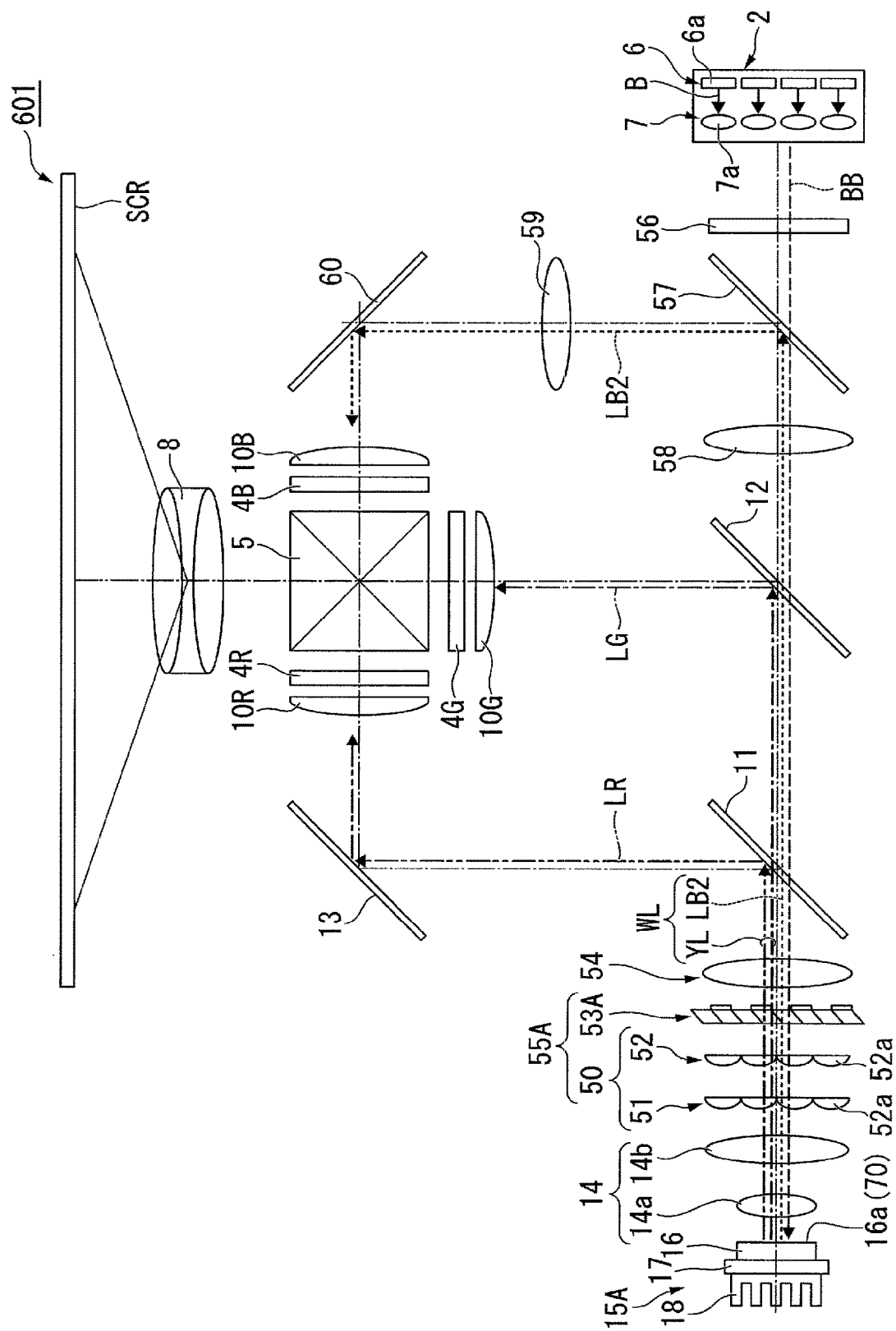
FIG. 8 is a schematic configuration diagram of a projector according to a seventh embodiment.

FIG. 8 is a schematic configuration diagram of the projector according to the present embodiment.

As shown in FIG. 8, the projector 601 according to the present embodiment is provided with the excitation light source 2, the first dichroic mirror 11, the second dichroic mirror 12, the mirror 13, the pickup optical system 14, a fluorescence emitting element 15A, a homogenizing illumination optical system 55A, the diffuser plate 56, a polarization separation mirror 57, a first lens 58, a second lens 59, a mirror 60, the light modulation device 4R, the light modulation device 4G, the light modulation device 4B, the combining optical system 5, and the projection optical device 8.

The projector 601 according to the present embodiment is different from the other embodiments in the point that there is generated white light obtained by combining a part of the excitation light BB consisting of blue light and the fluorescence YL consisting of yellow light with each other.

In the present embodiment, the excitation light BB emitted from the excitation light source 2 enters the polarization separation mirror 57. The polarization separation mirror 57 has a polarization separation function with respect to the excitation light BB. Specifically, the polarization separation mirror 57 transmits the P-polarized light with respect to the polarization separation mirror 57, and at the same time reflects the S-polarized light with respect to the polarization separation mirror 57. In the present embodiment, the excitation light source 2 emits the P-polarized light with respect to the polarization separation mirror 57 as the excitation light BB.

The excitation light BB transmitted through the polarization separation mirror 57 is diffused by the diffuser plate 56 so as to spread to the entire light path of the homogenous illumination optical system 55A. The homogenous illumination optical system 55A is provided with the integrator optical system 50, a polarization conversion element 53A, and the superimposing lens 54.

The superimposing lens 54 collimates the excitation light BB diffused by the diffuser plate 56, and then guides the excitation light BB to the polarization conversion element 53A.

Figure 9:
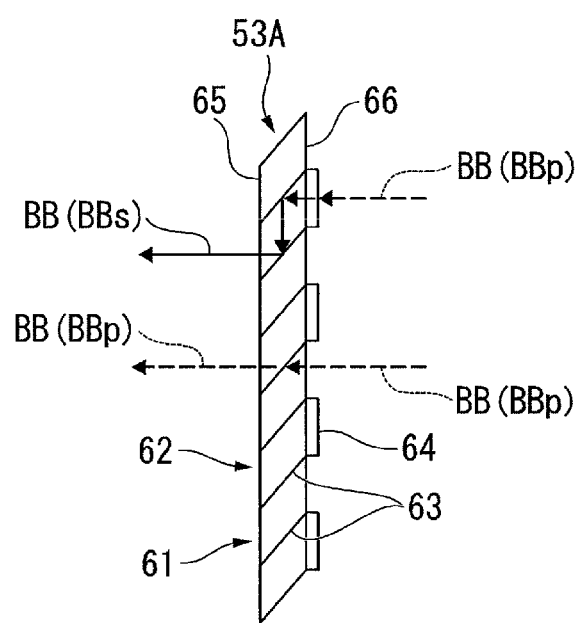
FIG. 9 is a diagram for explaining a configuration and a function of a polarization conversion element.

FIG. 9 is a diagram for explaining a configuration and a function of the polarization conversion element. As shown in FIG. 9, the polarization conversion element 53A in the present embodiment has a configuration of removing the light blocking mask 67 from the polarization conversion element 53 in the projector 501 according to the sixth embodiment, and the same in other configuration as the polarization conversion element 53.

In the present embodiment, the excitation light BB corresponds to the P-polarization component with respect to the polarization separation layers 63 in the polarization conversion element 53A. In other words, as shown in FIG. 8, the excitation light BB enters the light exit surface 66 of the polarization conversion element 53A as the P-polarization component BBp. The excitation light BB having entered the retardation layers 64 of the light exit surface 66 is provided with the phase difference as much as a half wavelength to thereby be converted into the S-polarization component BBs, and is reflected by two polarization separation layers 63, and is then emitted from the second areas 62 as the S-polarization component BBs. Further, the excitation light BB having entered the area where the retardation layer 64 is not disposed out of the light exit surface 66 is transmitted through the polarization separation layer 63, and then emitted from the second area 62 while being kept as the P-polarization component BBp.

The excitation light BB is transmitted through the polarization conversion element 53A to thereby be converted into the light in the state in which the P-polarized light and the S-polarized light are mixed with each other, and is then guided to the second area 62. In the polarization conversion element 53A in the present embodiment, since the light blocking mask 67 in the second areas 62 is omitted, the excitation light BB is emitted from the second areas 62.

The excitation light BB is transmitted through the integrator optical system 50, and then enters the fluorescence emitting element 15A in a converged state due to the pickup optical system 14. The fluorescence emitting element 15A in the present embodiment has the phosphor 16, the substrate 17, the heatsink 18, and a reflective ND filter (a function membrane) 70. The reflective ND filter 70 is disposed on a surface 16a of the phosphor 16.

The reflective ND filter 70 reflects a part of the excitation light BB, and at the same time transmits the rest of the excitation light BB, and transmits the fluorescence YL. A part of the excitation light BB reflected by the reflective ND filter 70 enters the pickup optical system 14 as blue light LB2. Further, the rest of the excitation light BB transmitted through the reflective ND filter 70 is used for generating the fluorescence YL in the phosphor 16. The fluorescence YL generated in the phosphor 16 is transmitted through the reflective ND filter 70, and then enters the pickup optical system 14. It should be noted that the transmittance of the excitation light BB in the reflective ND filter 70 is arbitrarily set in accordance with the necessary light intensity of the blue light LB2.

According to the fluorescence emitting element 15A in the present embodiment, since the reflective ND filter 70 is provided, it is possible to generate white illumination light WL obtained by combining the yellow fluorescence YL and the blue light LB2 with each other. The illumination light WL is collimated by the pickup optical system 14, and then enters the homogenous illumination optical system 55A.

The homogenous illumination optical system 55A homogenizes the illumination distribution on each of the light modulation devices 4R, 4G, and 4B in the illumination light WL.

Here, the fluorescence YL included in the illumination light WL is converted into the S-polarization component as shown in FIG. 7A when transmitted through the polarization conversion element 53 of the homogenous illumination optical system 55A. The blue light LB2 included in the illumination light WL is the light in the state in which the P-polarization component and the S-polarization component are mixed with each other, and is therefore converted into the S-polarization component when transmitted through the polarization conversion element 53 similarly to the florescence YL.

The illumination light WL going through the homogenous illumination optical system 55A enters the first dichroic mirror 11. The first dichroic mirror 11 reflects the red light LR out of the fluorescence YL included in the illumination light WL to guide the red light LR to the light modulation device 4R, and transmits the green light LG and the blue light LB2. The green light LG and the blue light LB2 transmitted through the first dichroic mirror 11 enter the second dichroic mirror 12. The second dichroic mirror 12 reflects the green light LG to guide the green light LG to the light modulation device 4G, and transmits the blue light LB2.

The blue light LB2 transmitted through the second dichroic mirror 12 goes through the first lens 58, and then enters the polarization separation mirror 57. In the present embodiment, the blue light LB2 goes through the homogenous illumination optical system 55A to thereby be converted into the S-polarized light. Therefore, the blue light LB2 having entered the polarization separation mirror 57 from the fluorescence emitting element 15A is reflected by the polarization separation mirror 57, goes through the second lens 59 and the mirror 60, and is then guided to the light modulation device 4B. In the present embodiment, since the polarization direction of the S-polarized light with respect to the polarization separation mirror 57 coincides with the transmission axis direction of the polarization plate disposed on the light incidence side of the light modulation device 4B, it is possible for the blue light LB2 to efficiently enter the light modulation device 4B.

As described above, according to the projector 601 related to the present embodiment, it is possible to achieve reduction in size of the device configuration. Further, in the projector 601 according to the present embodiment, by uniforming the polarization direction of the illumination light WL with the homogenous illumination optical system 55, it is possible to make the red light LR, the green light LG, and the blue light LB2 obtained by separating the illumination light WL efficiently enter the light modulation devices 4R, 4G, and 4B, respectively. Further, it is possible to generate the blue image light by making the blue light LB2 obtained by reflecting a part of the excitation light BB with the fluorescence emitting element 15A enter the light modulation device 4B. Thus, it becomes unnecessary to separately dispose the blue light source 30 for making the light enter the light modulation device 4B, it is possible to achieve reduction in cost.

It should be noted that the present disclosure is not limited to the contents of the embodiments described above, but can arbitrarily be modified within the scope or the spirit of the present disclosure.

Although in the embodiments described above, when the phosphor 16 is fixedly arranged is cited as an example of the fluorescence emitting element 15, it is also possible to use a rotary wheel type fluorescence emitting element for rotating a phosphor shaped like a ring.

What is claimed is:

1. A projector comprising:
a first light modulation device;
a second light modulation device;
a third light modulation device;
a first light source configured to emit excitation light;
a fluorescence emitting element which is excited by the excitation light to emit fluorescence toward an incidence side of the excitation light;
a first dichroic mirror configured to guide the excitation light to the fluorescence emitting element, and separate the fluorescence emitted from the fluorescence emitting element into first colored light and second colored light; and
a second dichroic mirror configured to guide the excitation light to the first dichroic mirror, and reflect the second colored light separated by the first dichroic mirror, wherein
the first colored light separated by the first dichroic mirror enters the first light modulation device, and the second colored light reflected by the second dichroic mirror enters the second light modulation device.

2. The projector according to claim 1, further comprising:
a reflective polarization plate disposed between the fluorescence emitting element and the first dichroic mirror.

3. The projector according to claim 1, further comprising:
a polarization conversion element disposed between the fluorescence emitting element and the first dichroic mirror, and configured to convert a polarization direction of the fluorescence.

4. The projector according to claim 2, further comprising:
a polarization conversion element disposed between the fluorescence emitting element and the first dichroic mirror, and configured to convert a polarization direction of the fluorescence.

5. The projector according to claim 1, further comprising:
a second light source configured to emit third colored light different in wavelength band from the first colored light and the second colored light toward the third light modulation device.

6. The projector according to claim 2, further comprising:
a second light source configured to emit third colored light different in wavelength band from the first colored light and the second colored light toward the third light modulation device.

7. The projector according to claim 3, further comprising:
a second light source configured to emit third colored light different in wavelength band from the first colored light and the second colored light toward the third light modulation device.

8. The projector according to claim 4, further comprising:
a second light source configured to emit third colored light different in wavelength band from the first colored light and the second colored light toward the third light modulation device.

9. The projector according to claim 1, wherein
the first light source emits third colored light different in wavelength band from the first colored light and the second colored light as the excitation light, and
a part of the third colored light enters the third light modulation device.

10. The projector according to claim 2, wherein
the first light source emits third colored light different in wavelength band from the first colored light and the second colored light as the excitation light, and
a part of the third colored light enters the third light modulation device.

11. The projector according to claim 3, wherein
the first light source emits third colored light different in wavelength band from the first colored light and the second colored light as the excitation light, and
a part of the third colored light enters the third light modulation device.

12. The projector according to claim 4, wherein
the first light source emits third colored light different in wavelength band from the first colored light and the second colored light as the excitation light, and
a part of the third colored light enters the third light modulation device.

13. The projector according to claim 9, further comprising:
a polarization separation mirror having a polarization separation function with respect to the third colored light, wherein
the polarization separation mirror transmits the third colored light proceeding toward the fluorescence emitting element and reflects apart of the third colored light reflected by the fluorescence emitting element to guide the part of the third colored light to the third light modulation device.

14. The projector according to claim 10, further comprising:
a polarization separation mirror having a polarization separation function with respect to the third colored light, wherein
the polarization separation mirror transmits the third colored light proceeding toward the fluorescence emitting element and reflects apart of the third colored light reflected by the fluorescence emitting element to guide the part of the third colored light to the third light modulation device.

15. The projector according to claim 11, further comprising:
a polarization separation mirror having a polarization separation function with respect to the third colored light, wherein
the polarization separation mirror transmits the third colored light proceeding toward the fluorescence emitting element and reflects apart of the third colored light reflected by the fluorescence emitting element to guide the part of the third colored light to the third light modulation device.

16. The projector according to claim 12, further comprising:
a polarization separation mirror having a polarization separation function with respect to the third colored light, wherein
the polarization separation mirror transmits the third colored light proceeding toward the fluorescence emitting element and reflects apart of the third colored light reflected by the fluorescence emitting element to guide the part of the third colored light to the third light modulation device.

17. The projector according to claim 9, wherein
the fluorescence emitting element includes a phosphor configured to generate the fluorescence and a function membrane disposed on a surface of the phosphor and configured to reflect a part of the third colored light and transmit a rest of the third colored light.

18. The projector according to claim 10, wherein
the fluorescence emitting element includes a phosphor configured to generate the fluorescence and a function membrane disposed on a surface of the phosphor and configured to reflect a part of the third colored light and transmit a rest of the third colored light.

19. The projector according to claim 11, wherein
the fluorescence emitting element includes a phosphor configured to generate the fluorescence and a function membrane disposed on a surface of the phosphor and configured to reflect a part of the third colored light and transmit a rest of the third colored light.

20. The projector according to claim 12, wherein
the fluorescence emitting element includes a phosphor configured to generate the fluorescence and a function membrane disposed on a surface of the phosphor and configured to reflect a part of the third colored light and transmit a rest of the third colored light.

* * * * *